(12) United States Patent
Caruso et al.

(10) Patent No.: US 6,248,859 B1
(45) Date of Patent: Jun. 19, 2001

(54) POLYCARBONATES SUITABLE FOR USE IN OPTICAL ARTICLE

(75) Inventors: Andrew James Caruso, Schenectady; Gary Charles Davis, Albany; Marc Brian Wisnudel, Clifton Park; Ramesh Hariharan, Guilderland, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/347,559

(22) Filed: Jul. 6, 1999

(51) Int. Cl.$^7$ .................................................... C08G 64/00

(52) U.S. Cl. .......................................... 528/196; 528/198

(58) Field of Search .............................................. 528/196

(56) References Cited

U.S. PATENT DOCUMENTS

| 4,978,578 | 12/1990 | Kanno et al. | 428/412 |
| 5,633,060 | 5/1997 | Tokuda et al. | 428/64.1 |

FOREIGN PATENT DOCUMENTS

| 0926180 | 6/1999 | (EP) . |
| 8234457 | 9/1996 | (JP) . |
| 9906464 | 2/1999 | (WO) . |

*Primary Examiner*—Terressa M. Boykin
(74) *Attorney, Agent, or Firm*—Noreen C. Johnson; Douglas E. Stoner

(57) ABSTRACT

The invention relates to polycarbonates comprising:
(a) carbonate structural units corresponding to structure (I)

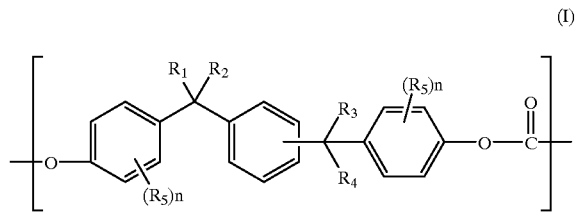

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2, and
(b) carbonate structural units corresponding to structure (II):

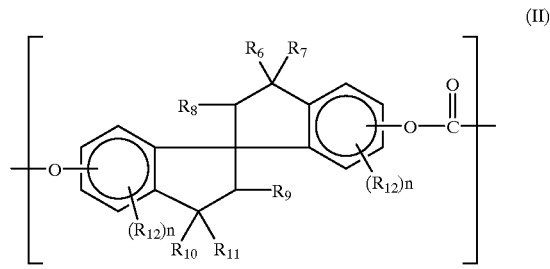

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2;
where the polycarbonate has a glass transition temperature of from about 120° C. to about 185° C. and a water absorption of less than about 0.33%.

This invention further relates to method of making these polycarbonates, optical articles made from these polycarbonates, and methods of making optical articles from these polycarbonates.

8 Claims, No Drawings

POLYCARBONATES SUITABLE FOR USE IN OPTICAL ARTICLE

FIELD OF THE INVENTION

This invention relates to polycarbonates suitable for use in optical articles, and methods for making such polycarbonates. This invention further relates to optical articles, and methods for making optical articles from the polycarbonates.

BACKGROUND OF THE INVENTION

Polycarbonates and other polymer materials are utilized in optical data storage media, such as compact disks. In optical data storage media, it is critical that polycarbonate resins have good performance characteristics such as transparency, low water affinity, good processibility, good heat resistance and low birefringence. High birefringence is particularly undesirable in high density optical data storage media.

Improvements in optical data storage media, including increased data storage density, are highly desirable, and achievement of such improvements is expected to improve well established and new computer technology such as read only, write once, rewritable, digital versatile and magneto-optical (MO) disks.

In the case of CD-ROM technology, the information to be read is imprinted directly into a moldable, transparent plastic material, such as bisphenol A (BPA) polycarbonate. The information is stored in the form of shallow pits embossed in a polymer surface. The surface is coated with a reflective metallic film, and the digital information, represented by the position and length of the pits, is read optically with a focused low power (5 mW) laser beam. The user can only extract information (digital data) from the disk without changing or adding any data. Thus, it is possible to "read" but not to "write" or "erase" information.

The operating principle in a WORM drive is to use a focused laser beam (20–40 mW) to make a permanent mark on a thin film on a disk. The information is then read out as a change in the optical properties of the disk, e.g., reflectivity or absorbance. These changes can take various forms: "hole burning" is the removal of material, typically a thin film of tellurium, by evaporation, melting or spalling (sometimes referred to as laser ablation); bubble or pit formation involves deformation of the surface, usually of a polymer overcoat of a metal reflector.

Although the CD-ROM and WORM formats have been successfully developed and are well suited for particular applications, the computer industry is focusing on erasable media for optical storage (EODs). There are two types of EODs: phase change (PC) and magneto-optic (MO). In MO storage, a bit of information is stored as a ~1 μm diameter magnetic domain, which has its magnetization either up or down. The information can be read by monitoring the rotation of the plane polarization of light reflected from the surface of the magnetic film. This rotation, called the Magneto-Optic Kerr Effect (MOKE) is typically less than 0.5 degrees. The materials for MO storage are generally amorphous alloys of the rare earth and transition metals.

Amorphous materials have a distinct advantage in MO storage as they do not suffer from "grain noise", spurious variations in the plane of polarization of reflected light caused by randomness in the orientation of grains in a polycrystalline film. Bits are written by heating above the Curie point, $T_c$, and cooling in the presence of a magnetic field, a process known as thermomagnetic writing. In the phase-change technology, information is stored in regions that are different phases, typically amorphous and crystalline. These films are usually alloys or compounds of tellurium which can be quenched into the amorphous state by melting and rapidly cooling. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with popular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as digital versatile disks (DVD) and higher density data disks for short or long term data archives, the design requirements for the transparent plastic component of the optical data storage devices have become increasingly stringent. In many of these applications, previously employed polycarbonate materials, such as BPA polycarbonate materials, are inadequate. Materials displaying lower birefringence at current, and in the future progressively shorter "reading and writing" wavelengths have been the object of intense efforts in the field of optical data storage devices.

Low birefringence alone will not satisfy all of the design requirements for the use of a material in optical data storage media. High transparency, heat resistance, low water absorption, ductility, high purity and few inhomogeneities or particulates are also required. Currently employed materials are found to be lacking in one or more of these characteristics, and new materials are required in order to achieve higher data storage densities in optical data storage media. In addition, new materials possessing improved optical properties are anticipated to be of general utility in the production of other optical articles, such as lenses, gratings, beam splitters and the like.

Birefringence in an article molded from a polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains.

The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "vertical birefringence" or VBR, which is described more fully below.

Two useful gauges of the suitability of a material for use as a molded optical article, such as a molded optical data storage disk, are the material's stress optical coefficient in the melt ($C_m$) and its stress optical coefficient in the glassy state ($C_g$), respectively. The relationship between $C_m$, $C_g$ and birefringence may be expressed as follows:

$$\Delta n = C_m \times \Delta \sigma_m \qquad (1)$$

$$\Delta n = C_g \times \Delta \sigma_g \qquad (2)$$

where $\Delta n$ is the measured birefringence and $\Delta \sigma_m$ and $\Delta \sigma_g$ are the applied stresses in the melt and glassy states, respectively. The stress optical coefficients $C_m$ and $C_g$ are a measure of the susceptibility of a material to birefringence induced as a result of orientation and deformation occurring during mold filling and stresses generated as the molded article cools.

The stress optical coefficients $C_m$ and $C_g$ are useful as general material screening tools and may also be used to predict the vertical birefringence (VBR) of a molded article, a quantity critical to the successful use of a given material in a molded optical article. For a molded optical disk, the VBR is defined as:

$$VBR = (n_r - n_z) = \Delta n_{rz} \qquad (3)$$

where $n_r$ and $n_z$ are the refractive indices along the r an z cylindrical axes of the disk; $n_r$ is the index of refraction seen by a light beam polarized along the radial direction, and $n_z$ is the index of refraction for light polarized perpendicular to the plane of the disk. The VBR governs the defocusing margin, and reduction of VBR will lead to alleviation of problems which are not correctable mechanically.

In the search for improved materials for use in optical articles, $C_m$ and $C_g$ are especially useful since they require minimal amounts of material and are relatively insensitive to uncontrolled measurement parameters or sample preparation methods, whereas measurement of VBR requires significantly larger amounts of material and is dependent upon the molding conditions. In general, it has been found that materials possessing low absolute values of $C_g$ and $C_m$ show enhanced performance characteristics, for example VBR, in optical data storage applications relative to materials having higher values of $C_g$ and $C_m$. Therefore, in efforts aimed at developing improved optical quality, widespread use of $C_g$ and $C_m$ measurements is made in order to rank potential candidates for such applications and to compare them with previously discovered materials.

In applications requiring higher storage density, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Another critical property needed for high data storage density applications is disk flatness. It is known that excessive moisture absorption results in disk skewing which in turn leads to reduced reliability during information recording and retrieval. Since the bulk of the disk is comprised of the polymer material, the flatness of the disk depends on the low water absorption of the polymeric material. In order to produce high quality disks through injection molding, the polymer, such as polycarbonate should be easily processed.

U.S. Pat No. 5,633,060 discloses an optical disk substrate derived from 1,1-bis-(4-hydroxyphenyl)-3,3,5-tetramethylcyclohexane (BPI). Additionally the polycarbonate may comprise units derived from 1,3-bis[2-(4-hydroxyphenyl)-2-propyl]benzene (BPM) and/or 2,2-bis(3-methyl-4-hydroxyphenyl)propane.

WO 99/06464 discloses copolycarbonates comprising structural units which include from 1,3-bis[2-(4-hydroxyphenyl)-2-propyl]benzene (BPM) and 6-hydroxy-1-(4'-hydroxyphenyl)-1,3,3-trimethylindane (CD-1). There is no disclosure of units derived from SBI or its derivatives in the application.

Japanese Kokai Patent Application No. 8-234457 discloses an electrophotographic photoreceptor which may include residues of spirobiindanes. There is no disclosure of optical materials having birefringence and other properties suitable for use in optical articles, or optical articles made from these materials.

There exists a need for compositions having good optical properties and good processibility and which are suitable for use in high density optical recording media. Polycarbonates manufactured by copolymerizing the aforementioned aromatic dihydroxy compounds, such as bisphenol A, with other monomers, such as SBI, may produce acceptable birefringence; however the glass transition temperature is often too high, resulting in poor processing characteristics. Consequently, the obtained moldings have low impact resistance. Further, the water absorption of such polycarbonates is unacceptable for higher density applications requiring a high degree of disk flatness.

SUMMARY OF THE INVENTION

In one aspect, the invention relates to polycarbonates comprising:

(a) carbonate structural units corresponding to structure (I)

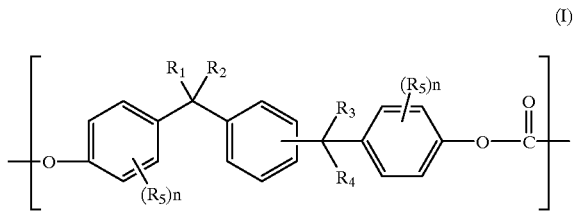

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2, and (b) carbonate structural units corresponding to structure (II):

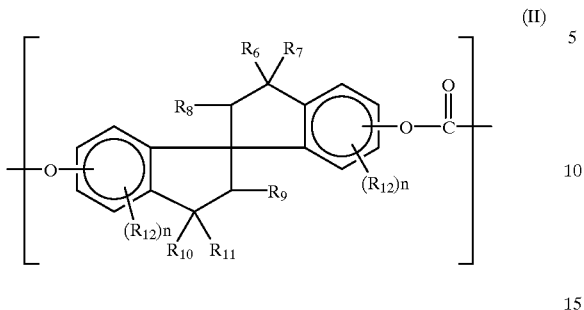

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2;
wherein the polycarbonate has a glass transition temperature of from about 120° C. to about 185° C. and a water absorption of less than about 0.33%.

This invention further relates to method of making these polycarbonates, optical articles made from these polycarbonates, and methods of making optical articles from these polycarbonates.

In a further embodiment, the invention relates to polycarbonates comprising:

(a) carbonate structural units corresponding to structure (I)

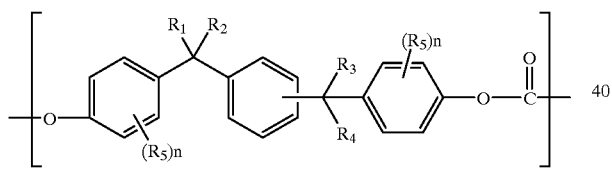

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2;

(b) carbonate structural units corresponding to structure (II):

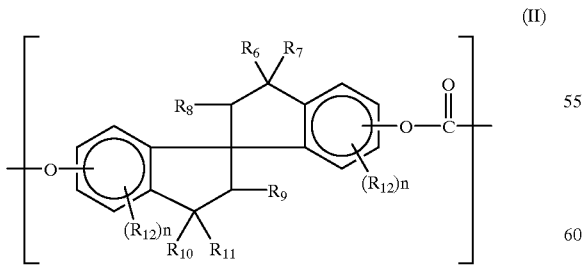

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2; and (c) carbonate structural units selected from the group consisting of
(1) carbonate structural units corresponding to

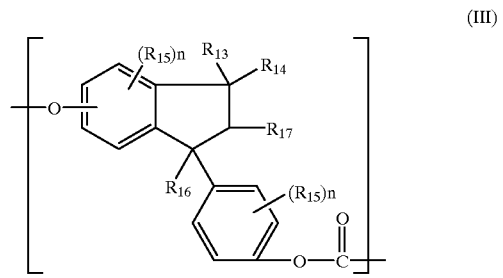

where
$R_{13}$, $R_{14}$ and $R_{16}$ independently represent $C_1$–$C_6$ alkyl,
$R_{15}$ is H or $C_1$–$C_3$ alkyl and n is 0, 1 or 2,
$R_{17}$ is H or $C_1$–$C_5$ alkyl;
(2) carbonate structural units corresponding to structure (IV):

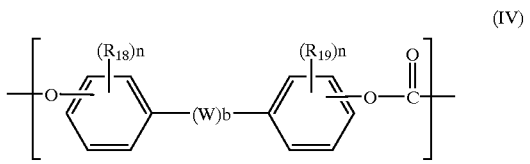

where
$R_{18}$ is independently selected from the group consisting of halogen, hydrogen, monovalent $C_1$–$C_6$ hydrocarbon, monovalent $C_1$–$C_6$ hydrocarbonoxy radicals,
$R_{19}$ is independently selected from the group consisting of halogen, hydrogen, monovalent $C_1$–$C_6$ hydrocarbon, and monovalent $C_1$–$C_6$ hydrocarbonoxy radicals;
W is selected from the group consisting of substituted or unsubstituted divalent $C_1$–$C_8$ hydrocarbon radicals,

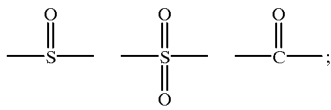

each n is independently selected from integers having a value of from 0 to 4 inclusive; and
b is zero or one; and
(3) carbonate structural units corresponding to structures (III) and (IV);
wherein the polycarbonate has a glass transition temperature of from about 120° C. to about 185° C. and a water absorption of less than about 0.33%.

DETAILED DESCRIPTION OF THE INVENTION

The present invention may be understood more readily by reference to the following detailed description of preferred embodiments of the invention and the Examples included therein.

Before the present compositions of matter and methods are disclosed, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as bisphenol A or 2,2-bis(4-hydroxyphenyl)propane.

"SBI" is herein defined as 6,6'-dihydroxy-3,3,3',3'-tetramethylspirobiindane.

"BPM" is herein defined as 1,3-bis-{2-(4-hydroxyphenyl)-2-propyl]benzene

"BPI" is herein defined as 1,1 bis-(4-hydroxyphenyl)-3,3,5-trimethylcyclohexane.

"BPZ" is herein defined as 1,1 bis-(4-hydroxyphenyl) cyclohexane

"BCC" is herein defined as 1,1-bis(4-hydroxy-3-methylphenyl) cyclohexane.

"CD-1" is herein defined as 6-hydroxy-1-(4'-hydroxyphenyl)-1,3,3-trimethylindane.

"$C_g$" is the stress optical coefficient of a polymeric material in the glassy state, measured in Brewsters ($10^{-13}$ cm$^2$/dyne)

"$C_m$" is the stress optical coefficient of a polymeric material in the melt phase, measured in Brewsters ($10^{-13}$ cm$^2$/dyne)

"Polycarbonate" or "polycarbonates" as used herein includes copolycarbonates, homopolycarbonates and (co) polyester carbonates.

"Optical articles" as used herein includes optical disks and optical data storage media, for example a compact disk (CD audio or CD-ROM), a digital versatile disk, also known as DVD (ROM,RAM, rewritable), a magneto optical (MO) disk and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, the polycarbonate may be used as a raw material for films or sheets.

Unless otherwise stated, "mol %" in reference to the composition of a polycarbonate in this specification is based upon 100 mol % of the repeating units of the polycarbonate. For instance, "a polycarbonate comprising 90 mol % of BPM" refers to a polycarbonate in which 90 mol % of the repeating units are residues derived from BPM diphenol or its corresponding derivative(s). Corresponding derivatives include but are not limited to, corresponding oligomers of the diphenols; corresponding esters of the diphenol and their oligomers; and the corresponding chloroformates of the diphenol and their oligomers.

The terms "residues" and "structural units", used in reference to the constituents of the polycarbonate, are synonymous throughout the specification.

As mentioned, in one aspect, this invention relates to polycarbonates and methods for preparing polycarbonates, the polycarbonate comprising:

(a) carbonate structural units corresponding to structure (I)

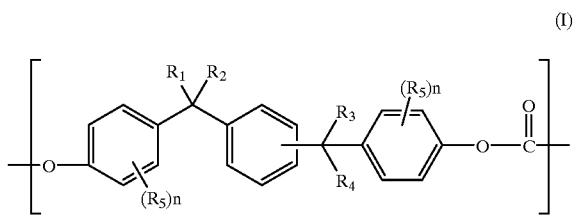

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2, and (b) carbonate structural units corresponding to:

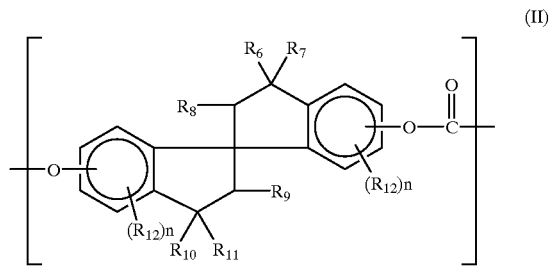

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2;

wherein the polycarbonate has a glass transition temperature of from about 120° C. to about 185° C. and a water absorption of less than about 0.33%.

This invention further relates to method of making these polycarbonates, optical articles made from these polycarbonates, and methods of making optical articles from these polycarbonates.

In a further aspect, the invention relates to polycarbonates comprising:

(a) carbonate structural units corresponding to structure (I)

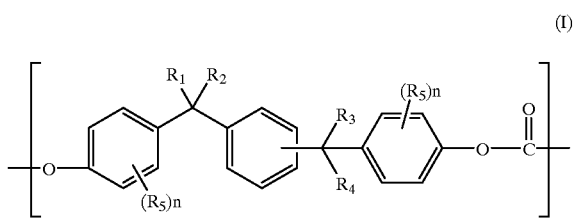

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2, and (b) carbonate structural units corresponding to:

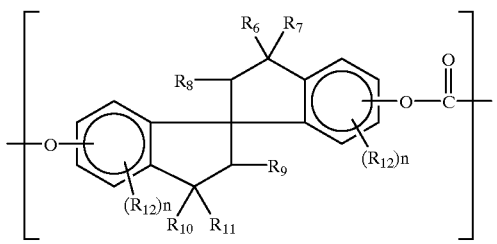

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2; and (c) carbonate structural units selected from the group consisting of
(1) carbonate structural units corresponding to

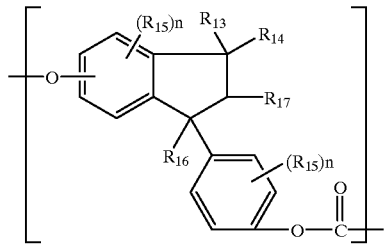

where
$R_{13}$, $R_{14}$ and $R_{16}$ independently represent $C_1$–$C_6$ alkyl,
$R_{15}$ is H or $C_1$–$C_3$ alkyl and n is 0, 1 or 2,
$R_{17}$ is H or $C_1$–$C_5$ alkyl;
(2) carbonate structural units corresponding to structure (IV):

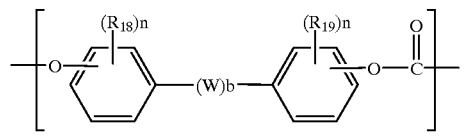

where
$R_{18}$ is independently selected from the group consisting of halogen, hydrogen, monovalent $C_1$–$C_6$ hydrocarbon, monovalent $C_1$–$C_6$ hydrocarbonoxy radicals,
$R_{19}$ is independently selected from the group consisting of halogen, hydrogen, monovalent $C_1$–$C_6$ hydrocarbon, and monovalent $C_1$–$C_6$ hydrocarbonoxy radicals;
W is selected from the group consisting of substituted or unsubstituted divalent $C_1$–$C_{18}$ hydrocarbon radicals,

—S—, —S—S—, —O—,

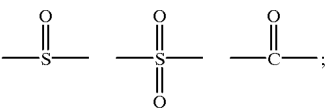

each n is independently selected from integers having a value of from 0 to 4 inclusive; and
b is zero or one; and
(3) carbonate structural units corresponding to structures (II) and (IV);
wherein the polycarbonate has a glass transition temperature of from about 120° C. to about 185° C. and a water absorption of less than about 0.33%.

The present invention addresses the aforementioned problems of processibility and water absorption, and provides compositions having good processibility and low water absorption. The composition further provides polycarbonates having good optical properties and suitable glass transition temperatures, and which are suitable for use in optical articles. Suitable glass transition temperatures are necessary to provide adequate processibility, for example good molding characteristics.

Further, the applicants have found that polycarbonates comprising the disclosed carbonate structural units are suitable for use in high data storage density optical media. In particular the polycarbonates of the present invention have good transparency, low water absorption, a suitable stress optical coefficient, good processibility, and good thermal stability.

In the present invention it is further critical that the polycarbonates posses other suitable properties for use in optical media. The polycarbonates of this invention preferably have glass transition temperatures in the range of about 120° to about 185° C., more preferably about 125° to about 165° C., even more preferably about 130 to about 150° C. The water absorption of the polycarbonates is preferably below about 0.33%, even more preferably less than about 0.20%.

The number average molecular weight ($M_W$) of the polycarbonate, as determined by gel permeation chromotography relative to polystyrene, is preferably from about 10,000 to about 100,000, more preferably between about 10,000 to about 50,000, even more preferably between about 12,000 to about 40,000.

The polycarbonate should have light transmittance of at least about 85%, more preferably at least about 90% and a $C_g$ of less than about 60 Brewsters, more preferably less than about 55 Brewsters, even more preferably less than about 50 Brewsters. The polycarbonate preferably has a $C_m$ of below about 3,000 Brewsters, more preferably below about 2,500 Brewsters, even more preferably less than about 2,450 Brewsters.

The compositions of a particular polycarbonate may be varied within certain ranges to achieve the suitable property profile. The following discussion sets forth illustrative ranges for the desired embodiments.

Representative units of component a) include, but are not limited to residues of:
1,3-Bis[2-(4-hydroxyphenyl)-2-propyl]benzene (BPM);
1,3-Bis[2-(4-hydroxy-3-methylphenyl)-2-propyl]benzene (BCC);
1,3-Bis[2-(3-ethyl-4-hydroxyphenyl)-2-propyl]benzene;
1,3-Bis[2-(4-hydroxy-3-propylphenyl)-2-propyl]benzene;
1,4-Bis[2-(4-hydroxyphenyl)-2-propyl]benzene;

1,4-Bis[2-(4-hydroxy-3-methylphenyl)-2-propyl]
benzene;
and mixtures thereof. Residues of BPM and BCC are preferred.

Representative units of component b), include, but are not limited to residues of 6,6'-dihydroxy-3,3,3',3'-tetramethyl spirobiindane(SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3', 3'-tetramethylspirobiindane (diethyl SBI) and mixtures thereof. Residues of SBI and its ortho alkylated homologs, and diethyl SBI are most preferred as component b).

Carbonate structural units (I) comprise from about 10 to about 80 mol % of the polycarbonate, preferably from about 25 to about 80 mol % of the polycarbonate, more preferably from about 25 to about 60 mol % of the polycarbonate, even more preferably about 30 to about 55 mol % of the polycarbonate.

Carbonate structural units (II) comprise from about 1 to about 90 mol % of the polycarbonate, preferably from about 20 to about 75 mol % of the polycarbonate, more preferably from about 40 to about 75 mole % of the polycarbonate, even more preferably from about 45 to about 70 mol % of the polycarbonate.

In one embodiment, structural units (I) are selected to be BPM, and structural units (II) are selected to be SBI. In this embodiment, BPM comprises from about 20 to about 80 mol % of the polycarbonate; preferably from about 30 to about 80 mol % of the polycarbonate; more preferably from about 35 to about 60 mol %; even more preferably about 45 to about 55 mol % of the polycarbonate. SBI comprises from about 1 to about 80 mol % of the polycarbonate; preferably from about 20 to about 70 mol % of the polycarbonate; more preferably from about 40 to about 65 mol % of the polycarbonate; even more preferably from about 45 to about 55 mol % of the polycarbonate. In a further embodiment, the polycarbonate consists essentially of BPM and SBI in the aforementioned ranges.

In a further embodiment, structural units (I) are selected to be BPM and structural units (II) are selected to be diethyl SBI. In this embodiment, BPM comprises from about 10 to about 80 mol % of the polycarbonate; preferably from about 30 to about 80 mol % of the polycarbonate; more preferably from about 35 to about 60 mol %; even more preferably about 40 to about 55 mol % of the polycarbonate. Diethyl SBI comprises from about 1 to about 90 mol % of the polycarbonate; preferably from about 20 to about 70 mol % of the polycarbonate; more preferably from about 40 to about 65 mol % of the polycarbonate; even more preferably from about 45 to about 60 mol % of the polycarbonate. In a further embodiment, the polycarbonate consists essentially of BPM and diethyl SBI in the aforementioned ranges.

Optionally the polycarbonate may further comprise from about 0.1 to about 20 mol % of structural units of structure (V):

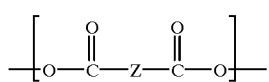

(V)

wherein Z is a $C_1$–$C_{40}$ branched or unbranched alkyl or branched or unbranched cycloalkyl.

Representative units of structure (V) include, but are not limited to, residues of dodecanedioic acid, sebacic acid, adipic acid, octadecanedioic acid, octadec-9 enedioic acid, 9-carboyxoctadecanoic acid and 10-carboxyoctadecanoic acid. Residues of dodecanedioic acid (DDDA) are the more preferred.

In a further embodiment, in addition to containing units of structures (I) and (II), the polycarbonate further comprises component (c), comprising structural units selected from the group consisting of:
(1) carbonate structural units corresponding to

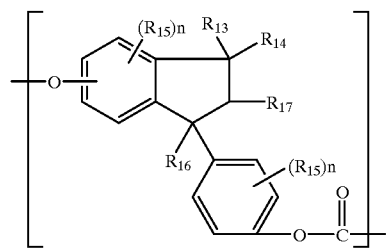

(III)

where
$R_{13}$, $R_{14}$ and $R_{16}$ independently represent $C_1$–$C_6$ alkyl,
$R_{15}$ is H or $C_1$–$C_3$ alkyl and n is 0, 1 or 2,
$R_{17}$ is H or $C_1$–$C_5$ alkyl;
(2) carbonate structural units corresponding to structure (IV):

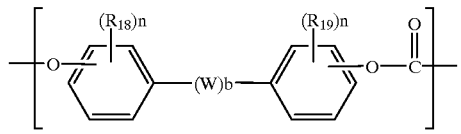

(IV)

where
$R_1$ is independently selected from the group consisting of halogen, hydrogen, monovalent hydrocarbon, monovalent hydrocarbonoxy radicals,
$R_2$ is independently selected from the group consisting of halogen, hydrogen, monovalent hydrocarbon, and monovalent hydrocarbonoxy radicals;
W is selected from the group consisting of substituted on unsubstituted divalent hydrocarbon radicals,

—S—, —S—S—, —O—,

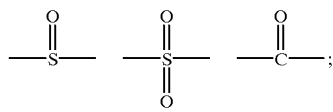

each n is independently selected from integers having a value of from 0 to 4 inclusive; and
b is zero or one; and
(3) carbonate structural units corresponding to structures (III) and (IV).

The structural units corresponding to structures (III) and (IV) may be selected to achieve a variety of effects; however, the choice should not unduly compromise the performance or properties of the end product as described. For example, structural units may be selected to raise or lower the $T_g$ of the product; to improve the polymer forming reaction; to adjust other properties in the polymer, such as moldability, clarity, toughness, $C_m$, $C_g$, etc; or to lower cost In this embodiment, carbonate units of structure (I) comprise from about 20 to about 80 mol %, preferably about 25 to about 75 mol %, more preferably about 25 to about 60 mol %, even more preferably about 30 to about 55 mol % of the polycarbonate.

Carbonate units of structure (II) comprise from about 1 to about 80 mol %, preferably from about 10 to about 70 mol %, more preferably from about 10 to about 65 mol %, even more preferably from about 10 to about 55 mol % of the polycarbonate. The residues of structure (III), (IV), or a mixture thereof comprise from about 1 to about 80 mol %, preferably about 5 to about 60 mol %, more preferably about 5 to about 40 mol %, even more preferably about 5 to about 35 mol % of the polycarbonate. Representative units of structure (I) and (II) are the same as those mentioned in reference to the first aspect of the invention.

In this embodiment, the polycarbonate may optionally further comprise from about 0.1 to about 20 mol % of structural units of structure (V):

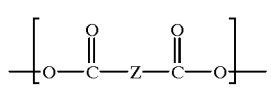

(V)

wherein Z is a $C_1$–$C_{40}$ branched or unbranched alkyl or branched or unbranched cycloalkyl. Representative units are the same as mentioned in reference to the first embodiment.

Representative units of structure (III), include, but are not limited to residues of 6-hydroxy-1-(4'-hydroxyphenyl)-1,3, 3-trimethylindane (CD-1); 6-hydroxy-1-(4'-hydroxy-3'-methylphenyl)-1,3,3,5-tetramethylindane. Residues of CD-1 are most preferred.

Representative units of structure (IV), include, but are not limited to residues of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4 hydroxyphenyl) propane; 2,2-bis(3,5-dibromo-4hydroxyphenyl)propane; 2,2-bis(3,5-dimethyl-4-hydroxyphenyl)propane; BCC; 1,1-bis(3,5-dimethyl-4-hydroxyphenyl)cyclohexane; 1,1-bis(4 hydroxyphenyl)decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4'-dihydroxyphenyl ether; 4,4'-thiodiphenol; 4-4'-dihydroxy-3, 3'-dichlorodiphenyl ether; BPI and mixtures thereof. In one embodiment, residues of BPA are selected as component (c). In a further embodiment, residues of BPI are selected as component (c)

In the embodiment in which structural units corresponding to residues of BPA is selected as component (c), residues of BPA preferably comprise from about 5 to about 35 mol % of the polycarbonate, even more preferably about 5 to about 15 mol of the polycarbonate.

In one embodiment, the polycarbonate comprises carbonate structural units corresponding to structure (III) and (IV). In this embodiment, the molar ratio of structure (III) to structure (IV) may vary from about 99:1 to about 1:99.

The polycarbonates of the invention may be prepared by the interfacial or the melt process. If the interfacial process is used, the addition of various phase transfer catalysts is optional. Phase transfer catalysts which are suitable include, but are not limited to tertiary amines, such as triethylamine, ammonium salts, such as tetrabutylammonium bromide; or hexaethylguanidium chloride.

Monosubstituted phenols, such as p-cumylphenol, phenol and 4-butylphenol; long chain alkylphenols, such as cardanol and nonyl phenol; and disubstituted phenols may be used as chain stopping agents. Optionally about 0.1 to about 10 mole %, more preferably about 2 to about 8 mole %, even more preferably about 3 to about 7 mole % of chainstopping agent may be incorporated into the polycarbonate, based on the total moles of the repeating units.

In some instances, the phosgenation conditions must be adjusted. In particular, the phosgenation conditions should be adjusted in cases where the formation of undesired cyclic oligomers is favored by the characteristic reactivity of the monomer, which is related to monomer solubility in the reaction medium and monomer structure. In the case of SBI, for example, cyclic oligomer formation occurs to a greater extent than the corresponding reaction of BPA under standard interfacial polymerization conditions under which only a slight excess (2 to 15%) of phosgene is employed. In polycarbonates containing substantial more than about 20 mol % of SBI or other monomer which tends to form cyclics under preparation conditions, it is advantageous to use an excess of phosgene to promote the formation of linear bischloroformate oligomers which are converted to high molecular weight polymers by partial hydrolysis and polycondensation. Preferably from about 20 to about 200 mol % of excess phosgene is used.

The polycarbonates of the invention may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide and heated under a vacuum according to a protocol in which the temperature is raised through a series of stages while the pressure in the headspace over the reaction mixture is lowered from ambient pressure to about 1 torr.

Suitable carbonate sources, catalysts and reaction conditions are found in U.S. Pat. No. 5,880,248, and *Kirk-Othmer Encyclopedia of Chemical Technology,* Fourth Edition, Volume 19, pp. 585–600, herein incorporated by reference. The time of the stages and the temperature are such that mechanical losses of material through foaming and the like are avoided. Phenol and excess diphenyl carbonate are removed overhead to complete the polymerization process. The product high polymer is then isolated as a melt which may be compounded with other additives, such as stabilizers and mold release agents prior to pelletization. The products produced by the melt process have reduced numbers of undissolved particles and reduced content of low molecular weight contaminants, such as cyclic oligomers, relative to the interfacially produced product.

The polycarbonates of the present invention may optionally be blended with any conventional additives used in optical applications, including but not limited to dyestuffs, UV stabilizers, antioxidants, heat stabilizers, and mold release agents, to form an optical article. In particular, it is preferable to form a blend of the polycarbonate and additives which aid in processing the blend to form the desired optical article. The blend may optionally comprise from about 0.0001 to about 10% by weight of the desired additives, more preferably from about 0.0001 to about 1.0% by weight of the desired additives.

Substances or additives which may be added to the polycarbonates of this invention, include, but are not limited to, heat-resistant stabilizer, UV absorber, mold-release agent, antistatic agent, slip agent, antiblocking agent, lubricant, anticlouding agent, coloring agent, natural oil, synthetic oil, wax, organic filler, inorganic filler and mixtures thereof. The addition of these substances or additives is optional, and may depend on the intended use of the product polycarbonate.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearoamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may optionally be used separately or in combination in the invention.

The polycarbonates may be random copolymers, block copolymers or graft copolymers. When graft copolymers and other branched polymers are prepared a suitable branching agent is used during production.

The desired optical article may be obtained by molding the polycarbonate or polycarbonate blend by injection molding, compression molding, extrusion methods and solution casting methods. Injection molding is the more preferred method of forming the article.

Because the polycarbonates of the present invention possess advantageous properties such as low water absorption, good processibility and low birefringence, they can be advantageously utilized to produce optical articles. End-use applications for the optical article of the invention include, but are not limited to, a digital audio disk, a digital versatile disk, an optical memory disk, a compact disk, an ASMO device and the like; optical lenses, such as contact lenses, lenses for glasses, lenses for telescopes, and prisms; optical fibers; magneto optical disks; information recording media; information transferring media; disks for video cameras, disks for still cameras and the like.

The polycarbonate may function as the medium for data storage, i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in ° C. or is at room temperature and pressure is at or near atmospheric.

The materials and testing procedures used for the results shown herein are as follows:

Molecular weights are reported as weight average ($M_w$) and were determined by gel permeation chromotography relative to polystyrene.

Water absorption (% $H_2O$) was determined by ASTM procedure D-0570.

$T_g$ values were determined by differential scanning calorimetry.

$C_g$ values were determined as follows. The polycarbonate (7.0 grams) was charged to a heated mold having dimensions 5.0×0.5 inches and compression molded at 120° C. above its glass transition temperature while being subjected to applied pressure starting at 0 and ending at 2000 pounds using a standard compression molding device. After the required amount of time under these conditions the mold was allowed to cool and the molded test bar removed with the aid of a Carver press. The molded test bar was then inspected under a polaroscope and an observation area on the test bar located. Selection of the observation area was based on lack of birefringence observed and sufficient distance from the ends or sides of the test bar. The sample was then mounted in a device designed to apply a known amount of force vertically along the bar while the observation area of the bar was irradiated with appropriately polarized light. The bar was then subjected to six levels of applied stress and the birefringence at each level measured with the aid of a Babinet compensator. Plotting birefringence versus stress affords a line whose slope is equal to the stress optical coefficient $C_g$.

Cm values are reported at $T_g$+100 degrees Celcius. A rectangular sample was subjected to a known oscillary strain rate and the shear stress was monitored. Simultaneously, a polarized laser beam was sent parallel to the shear plane. The birefringence and orientation were measured by modulating the light with a electrooptic modulator and monitoring the in-phase and out of phase component of the wave at the detector as taught by Kanana, M. R. and Kornfield, J. A, *Journal of Rheology,* 1994, 38(4).

5,5'diethyl SBI was prepared via the double Fries rearrangement of SBI diacetate followed by reduction of 5,5'-diacety SBI.

Fries Rearrangement of SBI Diacetate

SBI-diacetate (10.0 g, 25.5 mmol) and aluminum chloride (20 g, 150 mmol) were mixed well and heated to 170 C. for four minutes. The resulting reddish foam was then cooled to 0 C. and carefully diluted with cold water. The crude product was extracted with ethyl acetate, washed with brine, and dried with sodium sulfate to recover a dark foam. Upon trituration with acetonitrile, the product was recovered as an off-white solid (4 g, 40% yield). MP=212–214 C. NMR is consistent with desired 5,5'-diacetyl SBI.

Reduction of 5,5'-diacetyl SBI

At 0 C., ethylchloroformate (5.87 ml, 61.4 mmol) dissolved in 35 ml of THF was added to a solution of 5,5'-diacetyl SBI (10 g, 25.5 mmol), triethylamine (8.53 ml, 61.2 mmol), and 85 ml of THF. The mixture was stirred for an additional 30 minutes at 0 C. and then filtered. At 0 C., the filtrate was added dropwise to a mixture of sodium borohydride (7.7 g, 203 mmol) and 100 ml of water. The reaction was stirred at room temperature for one hour, poured into water, neutralized with 10% hydrochloric acid, and extracted with ethyl acetate. The organics were washed with brine, and dried with sodium sulfate to recover a white solid. The crude product was dissolved in ethyl acetate and toluene. Ethyl acetate was removed in vacuo. The remaining mixture was filtered, and the filtercake was washed with hexane to recover a white solid (6.9 g, 74% yield). MP=236–239 C. NMR is consistent with desired 5,5'-diethyl SBI.

The experimental results of Examples 1 through 6 and Comparative Examples 1 through 5 are summarized in the Table below.

been introduced. Following phosgenation four portions triethylamine (3×25 μL and 1×60 μL) were then added to the stirred mixture together with sufficient base to maintain pH 10.5 over a period of about 20 minutes. Additional phosgene (4.5 g) and sufficient 50% NaOH to maintain a pH of 10.5 were then added and the mixture was then stirred until the pH reached 9.9. The product polymer was isolated as described in Example 1.

Example 3

A 500 mL Morton flask equipped as in Example 1 above was charged diethyl-SBI (6.55 g, 18 mmol), BPM (6.23 g,

| Ex. | % BPM | % SBI | % DESBI | % CD1 | % BPI | % BPAT | Tg | Mn | Mw | Cg | Cm | % H2O |
|---|---|---|---|---|---|---|---|---|---|---|---|---|
| 1 | 60 | 40 | 0 | 0 | 0 | 0 | 127 | 9200 | 50700 | 40 | 1807 | 0.22 |
| 2 | 50 | 50 | 0 | 0 | 0 | 0 | 143 | 8200 | 45600 | 41 | 1438 | 0.26 |
| 3 | 50 | 0 | 50 | 0 | 0 | 0 | 129.8 | 6600 | 33800 | | | 0.16 |
| 4 | 50 | 20 | 0 | 0 | 30 | 0 | 146 | 12400 | 56900 | 46 | 1632 | 0.22 |
| 5 | 33.3 | 33.3 | 0 | 0 | 0 | 33.3 | 141 | 9600 | 35700 | 51.9 | | 0.26 |
| 6 | 45 | 45 | 0 | 0 | 0 | 10 | 142 | 11100 | 32300 | | | |
| Comparative Ex. | | | | | | | | | | | | |
| CE-1 | 20 | 0 | 0 | 0 | 0 | 80 | 130 | 8500 | 41600 | 68.1 | 3618 | 0.26 |
| CE-2 | 47 | 0 | 0 | 53 | 0 | 0 | 130 | 8500 | 33900 | | 2109 | 0.23 |
| CE-3 | 100 | 0 | 0 | 0 | 0 | 0 | 98 | 10800 | 47000 | 58.4 | 3500 | |
| CE-4 | 55 | 0 | 0 | 0 | 45 | 0 | 138 | | 42500 | 44.5 | 2598 | 0.23 |
| CE-5 | 0 | 0 | 0 | 0 | 0 | 100 | 145 | 15819 | 33119 | 81 | 4400 | 0.33 |

Example 1

A 500 mL Morton flask equipped with a phosgene inlet, mechanical stirrer, base addition drip tube, pH probe with feedback mechanism for automatic addition of aqueous base and reflux condenser atop which was fitted a gas exit tube with base scrubbers (2 in series) was charged with BPM (15.57 g, 45 mmol), SBI (9.24 g, 30 mmol), p-cumylphenol (410 mg, 1.9 mmol), CH$_2$Cl$_2$ (100 mL), H$_2$O (80 mL) and triethylamine (200 uL ). The mixture was stirred vigorously and phosgene was introduced at 0.6 g/minute while maintaining the pH at 10.5. When 1.2 equivalents of phosgene had been added phosgene addition was ceased and the reaction mixture was purged with nitrogen until a phosgene test strip indicated the vessel was free of phosgene. The reaction mixture was transferred to a separatory funnel and the brine layer removed . The organic phase was washed with 1N HCl and distilled water (4×) and then added dropwise to boiling water (750 mL) contained in a blender at high shear. The flocculant white product was filtered on a fritted funnel, washed with additional distilled water and dried in a vacuum oven for 24 h at 110° C. Tg=127° C. $^1$H-NMR (CDCl$_3$) indicated at 60:40 mixture of BPM and SBI structural units. The NMR sample afforded a tough transparent film when cast onto a glass slide.

Example 2

To a 500 mL Morton flask equipped as in Example 1 above was charged SBI (15.4 g, 50 mmol), BPM (17.3 g, 50 mmol), CH2Cl2 (125 mL) and water (90 mL). The pH of the stirred mixture was adjusted to 12.5 with 50% NaOH solution and phosgene was introduced at 0.6 g/min. together with sufficient 50% NaOH solution to maintain the pH at 12.5. After 10 g (102 mmol) of phosgene had been added p-cumylphenol (0.85 g, 4 mmol) was added to the reaction mixture and phosgenation together with base addition was continued until a total of 12.1 g (123 mmol) phosgene had 18 mmol), CH2CL2 (60 mL) and water (40 mL). The pH was adjusted to 12.5 with 50% NaOH solution. Phosgene was introduced at 0.25 g/min together with sufficient NaOH solution to maintain the pH of the reaction mixture at 12.5. When 3.6 g of phosgene had been added p-cumylphenol (0.34 g, 1.6 mmol) was added and phosgenation continued. When a total of 4.32 g phosgene had been added phosgene and base addition was ceased. Triethylamine (20 uL) was added to the stirred reaction mixture together with sufficient 50% NaOH to maintain a pH of 13. After 5 minutes additional triethylamine (30 uL) was added together with dropwise addition of sufficient 50% NaOH to maintain pH at about 13. After about 10 minutes chloroformates could no longer be detected in the reaction mixture. Additional phosgene (1.62 g) was then added together with sufficient 50% NaOH to maintain a pH of 10.5. Phosgenation was discontinued and triethylamine (50 uL) was added together with sufficient base to maintain the pH of about 10.5. After 10–15 minutes the mixture tested negative for the presence of chloroformates and base addition was halted. The final pH of the reaction mixture was 9.9. The polymer solution was separated from the brine phase by centrifugation and worked up as described in Example 1 to afford the indicated copolymer having a Tg 129.8° C. $^1$H-NMR indicated a 1:1 copolycarbonate of BPM and diethyl-SBI.

Example 4

To a 500 mL Morton flask equipped as in Example 1 above was charged SBI (3.56 g, 11.6 mmol), BPM (9.72 g, 28 mmol), BPI, 5.2 g, 16.8 mmol), p-cumylphenol (0.36 g, 1.7 mmol), CH2Cl2 (80 mL), water (80 mL) and triethylamine (125 μL) and treated with phosgene and 50% NaOH and isolated as described in Example 1 above to give the indicated copolycarbonate having a T$_g$ of 146° C.

Example 5

To a 500 mL Morton flask equipped as in Example 1 above was charged SBI (10.3 g, 33.3 mmol), BPM (11.5 g, 33.3 mmol), BPA (7.6 g, 33.3 mmol), CH2Cl2 (125 mL) and water (90 mL). The pH of the stirred mixture was adjusted to 10.5 with 50% NaOH solution. Phosgene was introduced at 0.6 g/min. together with sufficient 50% NaOH solution to maintain the pH at 10.5. When 10.0 g phosgene had been introduced p-cumylphenol (0.95 g, 4.5 mmol) were added. Phosgenation was continued until a total of 12.1 had been introduced. Triethylamine (125 uL) was added in three portions over a 10 minute period while monitoring the reaction mixture for the presence of chloroformates. During this time sufficient NaOH solution was added to maintain the pH of the reaction mixture at 9 to 10. After 28 minutes no chloroformates could be detected. At this point phosgenation was resumed and an additional 4.5 g of phosgene was introduced together with sufficient base to maintain the pH of the mixture at 9–10. The mixture was then sparged with nitrogen to remove excess phosgene and centrifuged to effect partition of the brine and organic layers. Workup and isolation as in Example 1 afforded the indicated polycarbonate whose $^1$H-NMR spectrum indicated a copolycarbonate comprised of a 1:1:1 mixture of the starting monomer subunits and having a stress optical coefficient, Cg, of 51.9 Brewsters. Using the experimental value of $C_m$=1438 obtained for the polycarbonate of Example 2 taken together with the known $C_m$ value of 4400 for BPA homopolycarbonate (Comparative Example 5), it is possible to estimate the probable value for $C_m$ in the present case to be about 2423 Brewsters by multiplying the weight fraction of each component by the $T_g$ of that component and obtaining the sum of these values.

Example 6

To a 500 mL Morton flask equipped as in Example 1 above was charged SBI (13.9 g, 45 mmol), BPM (15.6 g, 45 mmol), BPA (2.3 g, 10 mmol), CH2Cl2 (125 mL) and water (90 mL). The pH of the stirred mixture was adjusted to 10.5 with 50% NaOH solution. Phosgene was introduced at 0.6 g/min. together with sufficient 50% NaOH solution to maintain the pH at 10.5. When 10.0 g phosgene had been introduced p-cumylphenol (0.95 g, 4.5 mmol) added.

Phosgenation was continued until a total of 12.1 g had been introduced. Triethylamine (50 uL) was added in 2 portions over a 15 minute period portions together with sufficient 50% NaOH solution to maintain the pH of the reaction mixture at about 12. When the reaction mixture tested negative for the presence of chloroformates additional triethylamine (75 uL), additional phosgene (4.5 g) and sufficient 50% NaOH to maintain the pH of the reaction mixture at pH 12 were added. When phosgene addition was complete the mixture was sparged with nitrogen to remove excess phosgene and centrifuged to effect partition of the brine and organic layers. Workup and isolation as in Example 1 afforded the indicated polycarbonate whose $^1$H-NMR spectrum indicated a copolycarbonate comprised of a 45:45:10 mixture of the starting monomer subunits and having a Tg of 142° C. Using the experimental value of $C_m$=1438 obtained for the polycarbonate of Example 2 taken together with the known $C_m$ value of 4400 for BPA homopolycarbonate (Comparative Example 5), it is possible to estimate the probable value for $C_m$ in the present case to be about 1734 Brewsters by multiplying the weight fraction of each component by the $T_g$ of that component and obtaining the sum of these values.

Comparative Example 1

To a 500 mL Morton flask equipped as in Example 1 above was charged BPM (6.92 g, 20 mmol), BPA (18.2 g, 80 mmol), p-cumylphenol (0.95 g, 4.5 mmol), CH2Cl2 (125 mL), water (90 mL) and triethylamine (200 μL) and treated with excess phosgene and 50% NaOH solution and subsequently isolated as described in Example 1 above to give the indicated copolycarbonate having a Tg of 130° C. and a stress optical coefficient of 68.1 Brewsters.

Comparative Example 2

To a 500 mL Morton flask equipped as in Example 1 above was charged BPM (12.2 g, 35 mmol), CD-1 (10.6 g, 39.7 mmol), p-cumylphenol (0.72 g, 3.4 mmol), CH2Cl2 (100 mL), water (80 mL) and triethylamine (200 μL) and treated with excess phosgene and 50% NaOH solution and subsequently isolated as described in Example 1 above to give the indicated copolycarbonate having a Tg of 130° C. and stress optical coefficient of 57.9 Brewsters.

Comparative Example 3

To a 500 mL Morton flask equipped as in Example 1 above was charged BPM (12 g, 35 mmol), p-cumylphenol (0.37 g, 1.7 mmol), CH2Cl2 (80 mL), water (80 mL) and triethylamine (125 μL) and treated with excess phosgene and 50% NaOH solution and subsequently isolated as described in Example 1 above to give BPM homopolycarbonate having a Tg of 98° C.

Comparative Example 4

To a 500 mL Morton flask equipped as in Example 1 above was charged BPM (19.0 g, 55 mmol), BPI (1,1-bis (4-hydroxyphenyl)-3,5,5-trimehylcyclohexane; 13.9 g, 45 mmol), 4-t-butylphenol (0.68 g, 4.5 mmol), CH2Cl2 (125 mL), water (90 mL) and triethylamine (200 μL). The mixture was treated with phosgene and 50% NaOH and isolated according to the procedure described in Example 1 above to give the indicated copolycarbonate, having a $T_g$ of 138° C.

Comparative Example 5

LEXAN (BPA homopolycarbonate) was obtained from GE Plastics, Mt Vernon Ind.

The invention has been described in detail with particular reference to preferred embodiments thereof, but it will be understood that variations and modifications can be effected within the spirit and scope of the invention.

What is claimed is:
1. A polycarbonate comprising:
(a) carbonate structural units corresponding to structure (I)

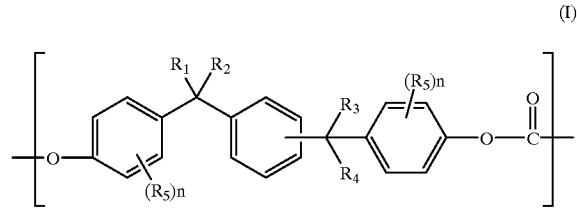

where $R_1$, $R_2$, $R_3$, and $R_4$ are independently selected from the group consisting of $C_1$–$C_6$ alkyl, $R_5$ is $C_1$–$C_3$ alkyl and n is 0, 1 or 2;

(b) carbonate structural units corresponding to structure (II)

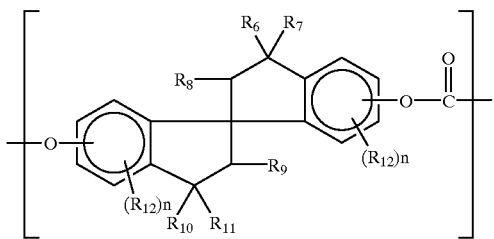

where
$R_6$, $R_7$, $R_{10}$ and $R_{11}$ are independently $C_1$–$C_6$ alkyl,
$R_8$ and $R_9$ are independently H or $C_1$–$C_5$ alkyl,
$R_{12}$ is H or $C_1$–$C_3$ alkyl and n is 0, 1 or 2; and (c) carbonate structural units corresponding to

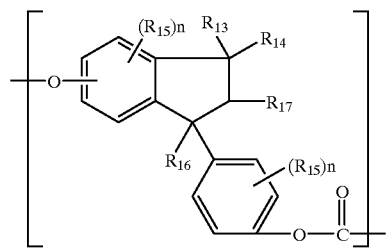

where
$R_{13}$, $R_{14}$ and $R_{16}$ independently represent $C_1$–$C_6$ alkyl,
$R_{15}$ is H or $C_1$–$C_3$ alkyl and n is 0, 1 or 2,
$R_{17}$ is H or $C_1$–$C_5$ alkyl;
wherein the polycarbonate has a glass transition temperature of from about 120° C. to about 185° C. and a water absorption of less than about 0.33%.

2. The polycarbonate of claim 1, wherein component a) is BPM.

3. The polycarbonate of claim 1, wherein component (a) is a residue of
1,3-Bis[2-(4-hydroxyphenyl)-2-propyl]benzene;
1,3-Bis[2-(4-hydroxy-3-methylphenyl)-2-propyl]benzene;
1,3-Bis[2-(3-ethyl-4-hydroxyphenyl)-2-propyl]benzene;
1,3-Bis[2-(4-hydroxy-3-propylphenyl)-2-propyl]benzene;
1,4-Bis[2-(4-hydroxyphenyl)-2-propyl]benzene;
1,4-Bis[2-(4-hydroxy-3-methylphenyl)-2-propyl]benzene;
or a mixture thereof;
and component (b) is a residue of 6,6'-dihydroxy-3,3,3',3'-tetramethyl spirobiindane; 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3',3'-tetramethylspirobiindane or a mixture thereof.

4. The polycarbonate as defined in claim 1, further comprising structural units corresponding to

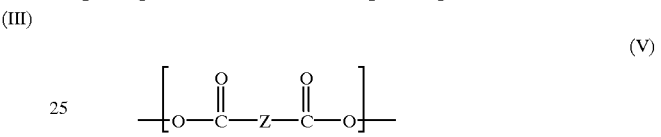

wherein Z is a $C_1$–$C_{40}$ branched or unbranched alkyl or cycloalkyl.

5. The polycarbonate as defined in claim 1, wherein component (a) comprises from about 10 to about 80 mole % of the polycarbonate and component (b) comprises from about 1 to about 90 mole % of the polycarbonate.

6. The polycarbonate of claim 4, wherein units of structure (V) comprise from about 0.1 to about 20 mole % of the polycarbonate.

7. An article comprising the polycarbonate of claim 1.

8. The article of claim 1, wherein the article is an optical data storage medium.

* * * * *